J. M. MARTIN, Jr.
Plow.
No. 219,748.  Patented Sept. 16, 1879.
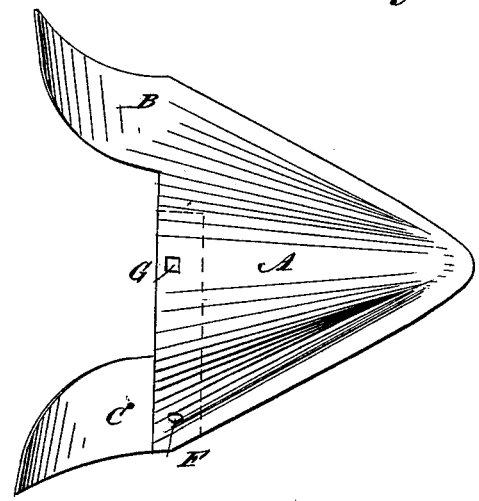
Fig. 1
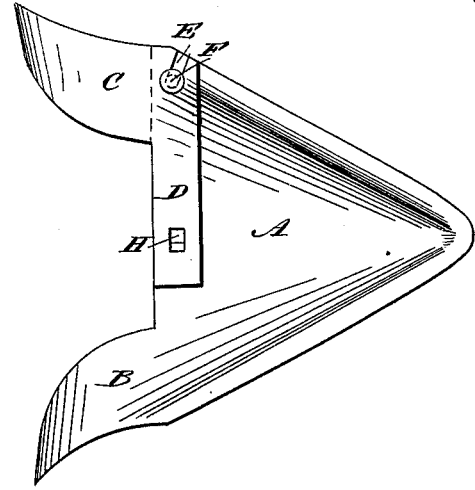
Fig. 2
Fig. 3
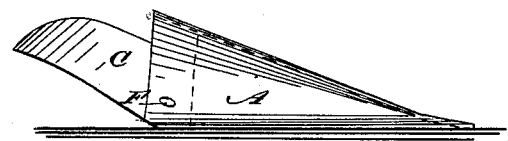
WITNESSES:
C. Neveux
C. Sedgwick
INVENTOR:
J. M. Martin Jr.
BY Munn & Co.
ATTORNEYS.

UNITED STATES PATENT OFFICE.

JOHN M. MARTIN, JR., OF OCALA, FLORIDA.

IMPROVEMENT IN PLOWS.

Specification forming part of Letters Patent No. 219,748, dated September 16, 1879; application filed June 20, 1879.

*To all whom it may concern:*

Be it known that I, JOHN M. MARTIN, Jr., of Ocala, in the county of Marion and State of Florida, have invented a new and Improved Plow, of which the following is a specification.

The invention consists in the arrangement of a plowshare provided with a detachable mold-board or wing, for the purpose of throwing more ground over the grass in the middle of the rows.

In the drawings, Figure 1 represents a top view of the plowshare. Fig. 2 represents a view from below the share. Fig. 3 represents a side view.

A is a plowshare, having a fixed wing, B, and flanged stud F. C is the detachable wing, which has a slot, E, and arm D. This arm D has a hole, H, which corresponds to a hole, G, in the plowshare A.

The detachable wing C is secured to the plowshare A by passing the flanged stud F into the slot E, and passing a bolt or pin through the holes H and G and through the stock, and thus holding the parts together.

The flanges of the stud F will prevent the wing from being loosened as long as the bolts hold D, A, and the stock together.

The detachable wing can very easily be removed and replaced, and the plow can thus be used to throw two mounds or only one, as may be desired, for if only one mound is to be thrown the detachable wing C is removed; but if two mounds are to be thrown, or if it is desired to throw ground against the plants to hill them, and at the same time to throw ground onto the grass, &c., that grows in the middle of the rows, the wing C is attached.

The plowshare, with the wing attached, may also be used to throw the ground against two rows of corn, cotton, rice, &c., (one being at each side of the plow,) at the same time.

The ordinary plow-stock can be adjusted to this share, thus avoiding the expense of new stocks.

Having thus described my invention, what I claim as new, and desire to secure by Letters Patent, is—

The plowshare A, having a fixed wing, B, a detachable wing, C, with apertured arm H D, and slot E, a flanged stud, F, and hole G, as shown and described, to adapt it to be used as specified.

JOHN MARSHALL MARTIN, JR.

Witnesses:
THOMAS R. GARY,
JNO. F. DUNN.